Jan. 30, 1923.

A. B. LINDMARK.
TOOL HOLDER.
FILED JAN. 28, 1921.

1,443,752

INVENTOR.
Andrew B. Lindmark
BY
Chamberlain & Newman ATTORNEYS.

Patented Jan. 30, 1923.

1,443,752

UNITED STATES PATENT OFFICE.

ANDREW B. LINDMARK, OF BRIDGEPORT, CONNECTICUT.

TOOL HOLDER.

Application filed January 28, 1921. Serial No. 440,574.

*To all whom it may concern:*

Be it known that ANDREW B. LINDMARK, a citizen of the United States, and resident of Bridgeport, in the county of Fairfield and State of Connecticut, has invented certain new and useful Improvements in Tool Holders, of which the following is a specification.

This invention relates to improvements in tool holders, and the object of the invention is to produce a novel, simple, efficient and practical tool holder having means whereby a tool can be readily inserted and securely clamped in position for use, can be easily adjusted in the holder, and can be quickly removed therefrom.

With the above and other objects in view, the invention comprises the construction and arrangement of parts as now to be fully described and hereinafter specifically claimed.

In the accompanying drawing forming a part of this specification,

Figure 1:
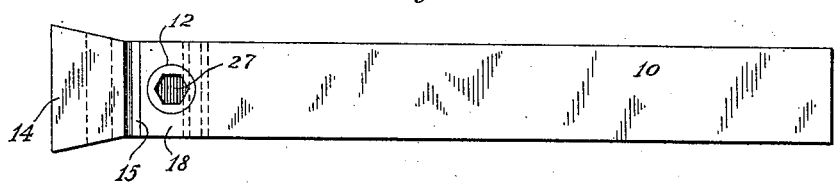
Fig. 1 is a plan view of the holder, showing a tool clamped in position for use.

The tool holder of this invention consists of but two simply constructed parts, namely, a bar 10 having a peculiarly shaped transverse opening 11 at one of its ends, and a set screw 12 adapted to extend into said transverse opening to firmly engage the shank, denoted by 13, of a cutter 14 to securely clamp said shank in said transverse opening. The transverse opening is of the special configuration to define an extension 15, an obliquely arranged, transversely disposed face 16, and a transverse shoulder 17.

Figure 2:
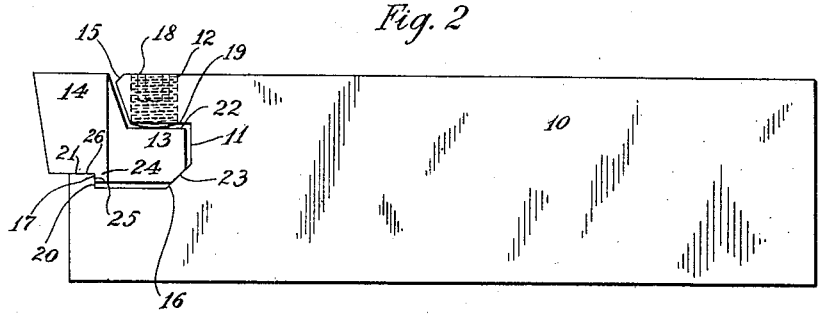
Fig. 2 is a side elevation corresponding with Fig. 1.
Figure 3:
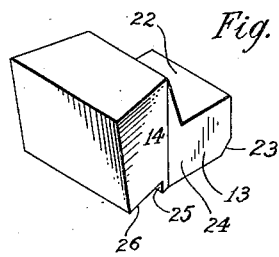
Fig. 3 is a perspective view of a tool adapted for use with the holder.

As more clearly disclosed in Fig. 2, extension 15 terminates short of the end of the bar which is to receive the cutter, and said extension is provided with a threaded opening extending from the outer face 18 thereof to the inner face 19 of said extension constituting one of the walls of the transverse opening, adapted to adjustably receive the set screw, whereby the set screw may be moved into and out of the transverse opening. Oblique face 16 is located at the inner end of said transverse opening, and is positioned opposite face 19 of the extension, and transverse shoulder 17 is located at the end of the bar which is to receive the cutter, in approximately longitudinal alignment with the oblique face, and opposite face 19, and has a preferably flat, transversely arranged face 20 that defines a wall of the opening and a preferably flat face 21 that is perpendicular to face 20 and extends between said last mentioned face and the adjacent end of the bar.

The shank of the cutter tool is of about the shape of the transverse opening, but of smaller dimension. That is to say, the shank is provided with a face 22 adapted to lie adjacent face 19 in the transverse opening in position to be engaged by the inner end of the set screw, with a beveled face 23 adapted to engage the oblique face 16 of the holder, and with a shoulder 24 adapted to engage transverse shoulder 17 of the opening of the bar. The shoulder of the cutter has a preferably flat face 25 adapted to engage face 20 of the transverse shoulder of the holder, and a preferably flat face 26 adapted to engage face 21 of the shoulder of the holder.

The method of clamping the cutter in the holder will be obvious from an inspection of the drawing. The set screw is turned in the threaded opening, as by means of concavity 27 in the upper end of the screw, so that its lower end is entirely within the extension and without the transverse opening. The cutter is next positioned in the transverse opening so that face 22 of its shank is located adjacent face 19 of the transverse opening and in position to be engaged by the set screw, and so that its shoulder 24 is adjacent the transverse shoulder of the transverse opening and its beveled face 23 is adjacent the obliquely arranged, transversely disposed face of said opening. The set screw is then turned in against the face of the shank of the cutter to cause the beveled face to slide over the oblique face and to firmly engage the same, and to cause the shoulders of the bar and cutter to tightly grip each other. That is to say, face 20 of the shoulder of the bar will be firmly engaged by face 25 of the cutter, and face 21 of the bar by face 26 of the cutter. As a consequence, the shank will have two points of engagement with the bar, namely, with the oblique face and with the transverse shoulder, and one point of engagement with the screw, to be securely clamped in the holder.

It is frequently desirable to adjust cutters in their holders, especially when portions of said cutters are worn away. In the present instance the adjustments can be easily and quickly made by simply retracting the screw, sliding the shank the desired distance in the holder and transversely of the opening thereof, and afterwards tightening the screw.

What I desire to claim is:

A tool holder consisting of a bar having a transverse opening through one of its ends, said transverse opening defining an extension, an oblique face opposite said extension, and at the inner end of said opening, and a transverse shoulder opposite said extension and at the outer end of said opening, a cutter having a face adapted to lie adjacent said extension, a beveled face adapted to engage said oblique face, and a shoulder adapted to engage said transverse shoulder, and a set screw arranged in said extension and adapted to engage said face of said cutter lying adjacent thereto, whereby said beveled face may be caused to slide over and firmly engage said oblique face and said shoulder of said cutter may be firmly pressed against said transverse shoulder of said holder.

Signed at Bridgeport in the county of Fairfield and State of Connecticut this 26th day of January A. D., 1921.

ANDREW B. LINDMARK.

Witnesses:
C. M. NEWMAN,
LILLIAN M. ALLING.